United States Patent [19]
Sbabo

[11] Patent Number: 5,672,112
[45] Date of Patent: Sep. 30, 1997

[54] ZERO CLEARANCE LOCKING MECHANISM FOR A DISCONNECT COUPLING DEVICE

[75] Inventor: Thomas L. Sbabo, Hamden, Conn.

[73] Assignee: Sikorsky Aircraft Corporation, Stratford, Conn.

[21] Appl. No.: 559,355

[22] Filed: Nov. 16, 1995

[51] Int. Cl.$^6$ ..................................................... F16D 3/18
[52] U.S. Cl. ..................... 464/157; 403/322; 403/325; 464/177
[58] Field of Search ............................ 464/157, 158, 464/177, 3; 403/321, 322, 325

[56] References Cited

U.S. PATENT DOCUMENTS

| | | | |
|---|---|---|---|
| 4,708,524 | 11/1987 | Goris | 403/322 X |
| 4,869,615 | 9/1989 | Galle | 403/321 X |
| 4,902,156 | 2/1990 | Deisler et al. | 403/322 X |
| 5,141,355 | 8/1992 | Stillwagon | 403/325 |
| 5,360,376 | 11/1994 | Baldino | 464/154 |

FOREIGN PATENT DOCUMENTS

| | | | |
|---|---|---|---|
| 2060840 | 6/1972 | Germany | 403/321 |

Primary Examiner—Daniel P. Stodola
Assistant Examiner—Eileen A. Dunn
Attorney, Agent, or Firm—Terrance J. Radke

[57] ABSTRACT

A zero clearance locking mechanism for a disconnect coupling device for a segmented driveshaft wherein the disconnect coupling device includes an input disconnect member having an input splined coupler integrated in combination therewith, an output disconnect member having an output splined coupler integrated in combination therewith, and a coil spring disposed in combination with the input disconnect member and operative to provide a biasing force. The locking mechanism includes a concentric lock housing secured in combination with the output disconnect member, an annular sleeve secured in combination with the coil spring, an annular equalizer plate disposed in free-floating combination with the input disconnect member in abutting engagement with the annular sleeve, a plurality of links mechanically connected in rotatable combination with the annular equalizer plate and equidistantly spaced about the circumference thereof, a locking dog mechanically connected in rotatable combination with each of the links, and a dog guide secured in combination with the input disconnect member in alignment with each locking dog, the dog guide defining a translational axis for the corresponding locking dog for displacement of the locking dog between a retracted position and an extended position. In the locked position of the locking mechanism, the biasing force exerted by the coil spring causes displacement of the locking dogs to the extended position wherein the locking dogs mechanically engage the concentric lock housing with a locking force to positively lock the input and output splined couplers in mechanical engagement in meshing combination. The structural configuration of the links and locking dogs in combination causes the locking force to be augmented by centrifugal force effects acting through the links and locking dogs.

8 Claims, 7 Drawing Sheets

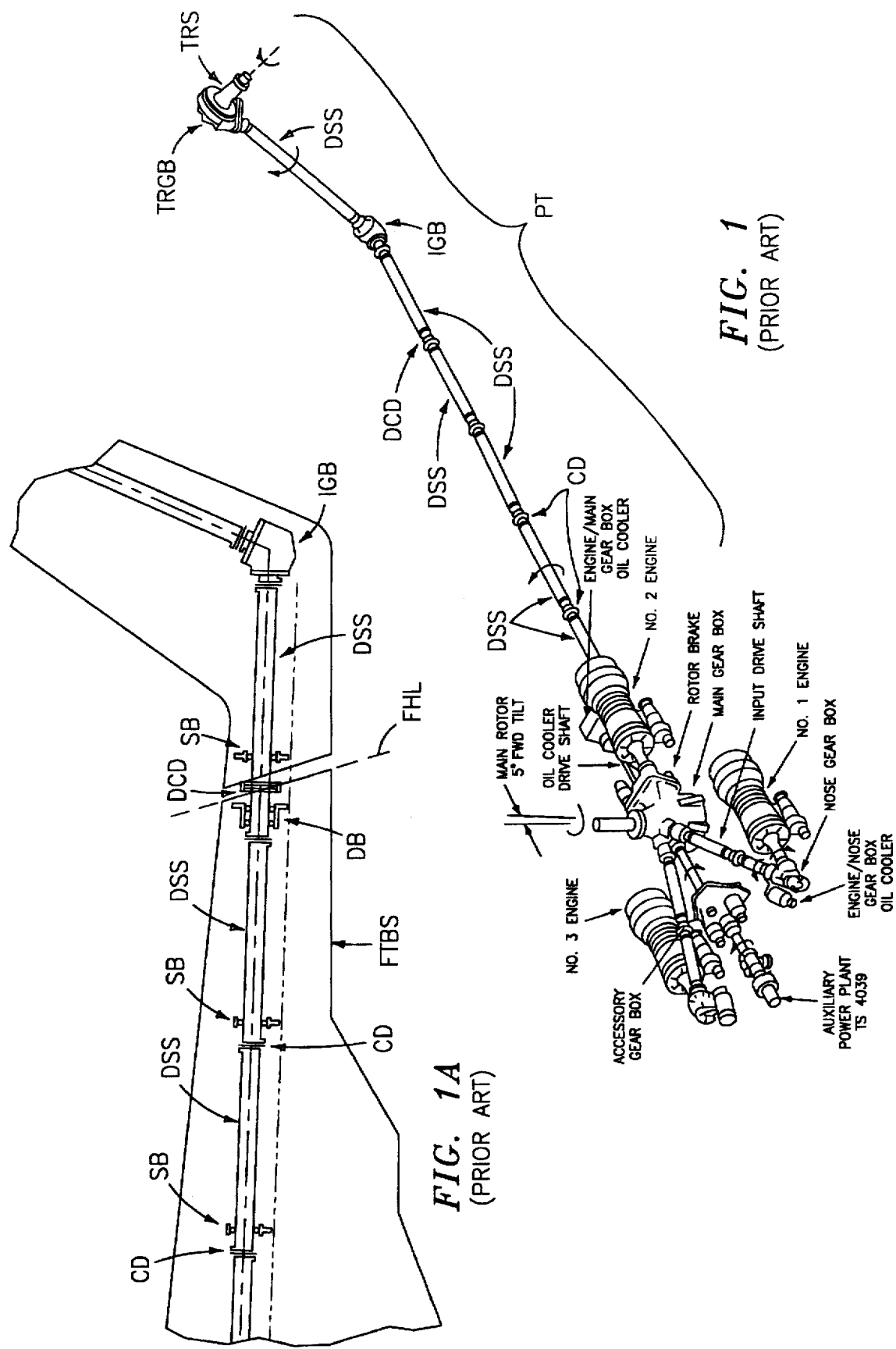

1

ZERO CLEARANCE LOCKING MECHANISM FOR A DISCONNECT COUPLING DEVICE

TECHNICAL FIELD

The present invention relates to coupling devices for driveshafts, and more particularly, to a zero clearance locking mechanism for a disconnect coupling device for segmented driveshafts.

BACKGROUND OF THE INVENTION

One concern in the transport, e.g., rapid deployment, routine movement, and/or long- or short-term storage, e.g., hangar stowage, shipboard stowage, oil rig stowage, of helicopters is the overall longitudinal dimension defined by the structural envelope of certain helicopters, particularly heavy-lift helicopters such the CH-53E helicopter manufactured by the Sikorsky Aircraft Corporation. To address this concern, such helicopters may be configured with a foldable tail boom structure intermediate the helicopter fuselage and tail rotor pylon. The foldable tail boom structure allows the tail rotor pylon to be folded adjacent the fuselage to decrease the overall longitudinal dimension of the structural envelope of the helicopter, thereby facilitating transport and/or storage of helicopters configured with a foldable tail boom structure.

Housed within the foldable tail boom structure is the tail rotor powertrain. The tail rotor powertrain is operative to divert power (torque) from the helicopter powerplant and to transmit such power to the tail rotor system of the helicopter (the tail rotor system being operative to counteract the torque effects produced by the helicopter main rotor system) by means of a tail rotor drivetrain. The tail rotor drivetrain includes a driveshaft that extends between the powerplant and a tail rotor pylon torque-coupling device, e.g., intermediate gear box and/or tail rotor gear box, and is operative to transfer power from the powerplant to the tail rotor pylon torque-coupling device.

Design of an efficacious tail rotor driveshaft for larger helicopters poses several challenges. First, the rotational axis of the tail rotor system may not lie in the same plane as the helicopter powerplant such that the tail rotor driveshaft must be configured to transmit power along two different axes. For example, with respect to the tail rotor driveshaft of the CH-53E helicopter, the axis of the tail rotor driveshaft extends longitudinally between the powerplant and an intermediate gear box and then vertically/laterally (the CH-53E tail rotor pylon is canted with respect to the vertical axis of the helicopter) between the intermediate gear box and a tail rotor gear box (see FIGS. 1, 1A).

Secondly, the maximum rotational speed of a driveshaft is limited by the critical shaft rotational speed, i.e., the rotational shaft speed above which shaft instability occurs. The critical rotational speed of a shaft is defined in part by the length of the shaft, the physical and geometric properties of the shaft, and the loads, e.g., vibratory, induced in the driveshaft during operation thereof.

As a result of these two factors, the helicopter tail rotor drivetrain of larger helicopters typically comprises a series of segmented driveshafts (rather than a single driveshaft which would reduce the overall complexity of the tail rotor drivetrain). FIG. 1 illustrates the trail rotor powertrain PT of the CH-53E helicopter manufactured by Sikorsky Aircraft Corporation. The CH-53E powertrain PT, which diverts power from the powerplant to the tail rotor system TRS, includes a drivetrain that comprises a plurality of segmented driveshafts DSS and support bearings, e.g., simplex support bearings SB, duplex bearings DB (see FIG. 1A) that are rigidly secured to the helicopter airframe wherein each segmented driveshaft DSS is supported at or near the ends thereof by such support bearings, an intermediate gearbox IGB, a tail rotor gearbox TRGB, coupling devices CD, e.g., a Thomas coupling, that provide a mechanical engagement interface between adjacent segmented driveshafts DSS for transmitting torque therebetween, and a disconnect coupling device DCD. The disconnect coupling device DCD is operative to rapidly decouple (or couple) adjacent driveshaft segments as a prestep to folding the tail rotor pylon. When the helicopter is operating, it is imperative that the coupling devices CD, and in particular, the disconnect coupling device DCD, maintain continuous mechanical engagement between the segmented driveshafts for power transmission to the tail rotor system TRS.

For helicopters incorporating the foldable tail boom structure FTBS (see FIG. 1A), additional design challenges with respect to the tail rotor drivetrain and in particular, the disconnect coupling device DCD that provides the mechanical engagement interface for the adjacent segmented driveshafts DSS at the fold hinge line FHL (see FIG. 1A), must be considered. The disconnect coupling device DCD, in addition to maintaining continuous mechanical engagement between adjacent segmented driveshafts DSS during operation of the helicopter, must be configured to provide a rapid decoupling (and coupling) capability such that the segmented driveshafts DSS can be easily mechanically decoupled and separated (or coupled) at the fold hinge line FHL to allow the tail rotor pylon to be folded adjacent the fuselage for repositioned for flight operations).

Furthermore, the tail rotor drivetrain and disconnect coupling device DCD must be configured to be relatively insensitize to any of various types of misalignments, e.g., axial misalignment, angular misalignment, and/or parallel misalignment or offset, that may occur with respect to adjacent segmented driveshafts. Misalignments in the tail rotor drivetrain occur as a result of the flexibility of the airframe in response to flight loading, i.e., deflections are induced in the tail rotor drivetrain, and system operating loads, e.g., vibrations, acting on the drivetrain. Axial misalignment is defined as a coaxial spatial separation between adjacent segmented driveshafts. FIGS. 2A, 2B schematically illustrate angular misalignment and parallel offset, respectively (greatly exaggerated for purposes of explication). With reference to FIG. 2A, angular misalignment is defined as an angular offset between the rotational axis $A_{DSS}$ of the segmented driveshaft DSS and the rotational axis $A_{DCD}$ of the disconnect coupling device DCD (note that the input rotational axis $A_{IGB}$ of the intermediate gearbox IGB remains collinear with the rotational axis $A_{DSS}$ of a segmented driveshaft DSS). With reference to FIG. 2B, parallel offset is defined as an angular offset between the rotational axis $A_{DSS}$ of a segmented driveshaft DSS and the rotational axis $A_{DCD}$ of the disconnect coupling device DCD and an angular offset between the input rotational axis $A_{DSS}$ of the segmented driveshaft DSS and the input rotational axis $A_{IGB}$ of the intermediate gearbox IGB wherein the rotational axis $A_{DCD}$ of the disconnect coupling device DCD and the input rotational axis $A_{IGB}$ of the intermediate gearbox IGB are approximately parallel. Such misalignments can result in loss of torque transmission across the disconnect coupling device, higher-than-normal wear in the splined components of the disconnect coupling device (see following paragraphs), and/or excessive loading of the support bearings.

One prior art disconnect coupling device comprises an interactive splined arrangement wherein the torque-transfer ends of adjacent segmented driveshafts are configured with male splines and female splines, respectively. The female splines are formed on a coupling that is slidably disposed on the outer periphery of the output driveshaft segment. The splined coupling is biasable with respect to the male splines by means of a coil spring to effect mechanical engagement between the male and females splines. Torque transfer between the adjacent segmented driveshafts is effected through the mechanical engagement between the male and female splines. Decoupling of the adjacent segmented driveshafts is effected by compressing the coil spring to bias the splined coupling out of mechanical engagement with the male splines, thereby facilitating angular displacement of the output driveshaft segment about the fold hinge line during folding of the tail rotor pylon.

A variant of the foregoing interactive splined arrangement comprises an arrangement wherein adjacent segmented driveshafts (input and output) are configured with external splines (male). A common sleeve having internal splines is linearly biasable by means of an actuator to a concentric position with respect to the external splines of the input and output segmented driveshafts, thereby effecting mechanical engagement between the external splines of the input and output segmented driveshafts and the internal splines of the common sleeve. Torque transfer between the input the and output segmented driveshafts is effected through the mechanical engagement of the male splines of the input segmented driveshaft with the internal splines of the common sleeve and the mechanical engagement of the internal splines of the common sleeve with the male splines of the output segmented driveshaft. Decoupling of the adjacent segmented driveshafts is effected by activating the actuator to linearly bias the common sleeve such that the common sleeve is not concentrically positioned with respect to the external splines of the output segmented driveshaft, thereby facilitating angular displacement of the output segmented driveshaft about the fold hinge line during folding of the tail rotor pylon.

Another prior art disconnect coupling device that is similar to the interactive splined arrangement described in the preceding paragraph is described in detail in U.S. Pat. No. 5,360,376 and is exemplarily illustrated in FIG. 3. Summarily, with reference to FIG. 3, an input segmented driveshaft 100 and an output segmented driveshaft 200 are mechanically coupled in combination by means of a disconnect coupling device 110 (the last two digits of the hundred-series reference numerals herein correspond to the two-digit reference numerals in the '376 patent). An output disconnect member 205 is integrated in combination with a flange member 210, which is fixedly secured to the output segmented driveshaft 200, by means of a flexible coupling 214. The flexible coupling 214 permits axial and angular motion of the output disconnect member 205 with respect to the fixed flange member 210, thereby accommodating misalignments between the input and output segmented driveshafts 100, 200 while maintaining efficient torque transmission therebetween. A splined output coupler 150 is mechanically integrated in combination with the output disconnect member 205.

An input disconnect member 120 is mechanically integrated in combination with the input segmented driveshaft 100 and rotatably supported in combination therewith by means of a duplex bearing assembly 122 (the duplex bearing assembly 122 is rigidly secured to the airframe by means of the bearing flange 122F). A splined input coupler 130 is mechanically integrated in combination with the input disconnect member 120.

Slidably mounted in combination with the splined input coupler 130 is a female spline assembly 140. The female spline assembly 140 is disposed for sliding movement with respect to the male input and output splines 130, 150 by means of a coil spring 142. The coil spring 142 is operative to bias (and maintain) the female spline assembly 140 in intermeshing engagement with the male input and output splines 130, 150 wherein torque is transferred from the input segmented driveshaft 100 to the output segmented driveshaft 200. The coil spring 142 is compressible by means of a yoke mechanism 194 to move the female spline assembly 140 out of intermeshing engagement with the splined output coupler 150, thereby permitting decoupling and angular displacement of the output segmented driveshaft 200 for folding of the tail rotor pylon.

To preclude loss of torque transmission due to inadvertent axial separation between the female spring assembly 140 and the splined output coupler 150 during rotation of the disconnect coupling device 110, the disconnect coupling device 110 includes a locking mechanism 170 that is operative to secure the female spline assembly 140 to the splined output coupler 150 (the locking mechanism 170, however, is not operative to transmit torque from the input segmented driveshaft 100 to the output segmented driveshaft 200). The locking mechanism 170 comprises a concentric cage segment 171 having a plurality of apertures 176, a plurality of locking balls 180 seated in the apertures 176, an output coupler 182 having a singular annular locking detent 184 (as opposed to the plurality of locking detents described in the '376 patent) secured in combination with the splined output coupler 150, and an outer housing 186. In the locked position, the outer housing 186 is biased into engagement with the concentric cage segment 171, female spline assembly 140 combination by means of belleville springs 188, thereby biasing the protruding locking balls 180 into engagement with the locking detents 184 to lock the female spline assembly 140 to the splined output coupler 150.

While the foregoing disconnect coupling device 110 with the locking mechanism 170 is generally effective in locking the female spline assembly 140 in intermeshing combination with the input and output splines 130, 150, development testing of this embodiment revealed several deficiencies that obviated use of the above-described locking mechanism 170 as a production design solution for eliminating axial separation during operation of the disconnect coupling device 110. One such deficiency was the looseness inherent in the design of the locking mechanism 170. Clearance must be designed into the locking mechanism 170 to facilitate locking thereof. Such a design clearance, however, allows misalignments to be induced in the segmented driveshaft 200 aft of the disconnect coupling device 110. In addition, the above-described locking mechanism 170 could be adversely affected by centrifugal force effects. Centrifugal force tended to bias the locking balls 180 outwardly against the outer housing 186, and in several instances, caused the outer housing 186 to be backed out of engagement with the output coupler 182.

A need exists to provide a locking mechanism for a disconnect coupling device that provides positive locking of the disconnect coupling device during operation thereof and which is not adversely affected by centrifugal force. The configuration of the locking mechanism should not require any inherent design clearance to facilitate integration and/or use thereof in combination with the disconnect coupling device. The locking mechanism should be compatible with existing disconnect coupling device designs, should embody a relatively uncomplicated mechanical configuration, and should be easily fabricated and assembled in combination with existing disconnect coupling devices.

DISCLOSURE OF THE INVENTION

One object of the present invention is to provide a locking mechanism for a disconnect coupling device that provides positive locking of the disconnect coupling device during operation thereof and is not adversely affected by centrifugal force.

Another object of the present invention is to provide a locking mechanism for a disconnect coupling device that has a zero clearance configuration that provides a rigid support for the output driveshaft segment mechanically interconnected to the disconnect coupling device.

Yet another object of the present invention is to provide a locking mechanism for disconnect coupling devices that is compatible with existing disconnect coupling device designs.

A further object of the present invention is to provide a locking mechanism for disconnect coupling devices that has a relatively uncomplicated mechanical configuration.

Yet a further object of the present invention is to provide a locking mechanism having a configuration wherein the locking force provided by the locking mechanism is augmented by centrifugal force effects during rotation of the disconnect coupling device.

These and other objects of the present invention are achieved by a locking mechanism for a disconnect coupling device for a segmented driveshaft wherein the disconnect coupling device includes an input disconnect member having an input splined coupler integrated in combination therewith, an output disconnect member having an output splined coupler integrated in combination therewith, and a coil spring disposed in combination with the input disconnect member and operative to provide a biasing force.

The locking mechanism comprises a concentric lock housing secured in combination with the output disconnect member, an annular equalizer plate disposed in free-floating combination with the input disconnect member and operatively interconnected to the coil spring, and a plurality of links mechanically connected in rotatable combination with the annular equalizer plate. The plurality of links are equidistantly spaced about the circumference of the annular equalizer plate.

The locking mechanism further comprises a locking dog mechanically connected in rotatable combination with each of the links, and a dog guide secured in combination with the input disconnect member in alignment with each locking dog. The dog guide defines a translation axis for the corresponding locking dog for displacement of the locking dog between a retracted position and an extended position.

In a locked position of the locking mechanism, the biasing force exerted by the coil spring causes displacement of the locking dogs to the extended position wherein the locking dogs mechanically engage the concentric lock housing with a locking force. The locking force exerted by the locking dogs precludes axial displacement of the concentric lock housing, thereby positively locking the input and output splined couplers in mechanical engagement for optimal torque transmission during rotation of the disconnect coupling device.

The structural configuration of the links and locking dogs in combination causes the locking force to be augmented by centrifugal force effects acting through the links and locking dogs.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 1 is a perspective view of the tail rotor powertrain of a CH-53E helicopter manufactured by the Sikorsky Aircraft Corporation.

FIG. 1A is a partial cut-away side plan view of the tail rotor powertrain of FIG. 1 housed within the foldable tail boom structure of the CH-53E helicopter.

BEST MODE FOR CARRYING OUT THE INVENTION

Figure 2A:
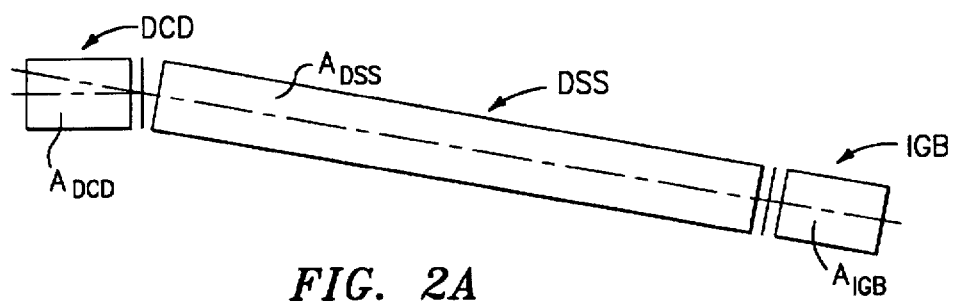
FIG. 2A is a schematic plan view illustrating angular misalignment of a segmented driveshaft (greatly exaggerated for purposes of explanation).
Figure 2B:
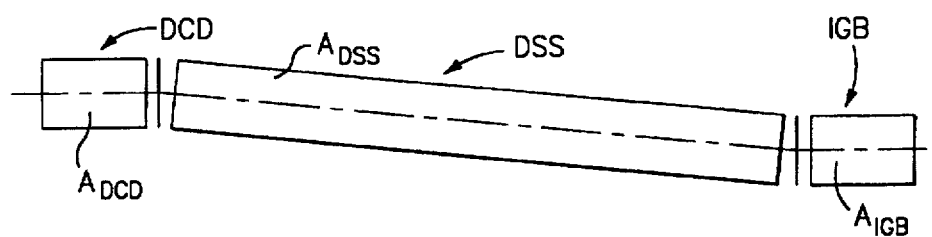
FIG. 2B is a schematic plan view illustrating parallel offset of a segmented driveshaft (greatly exaggerated for purposes of explanation).
Figure 3:
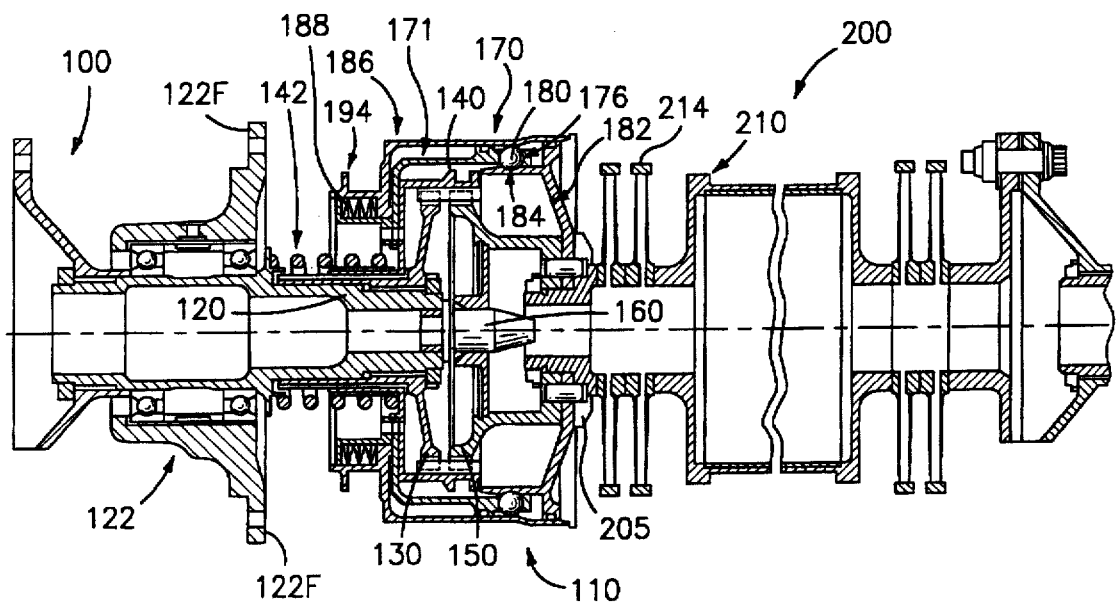
FIG. 3 is a cross-sectional view of a prior art disconnect coupling device.
Figure 4A:
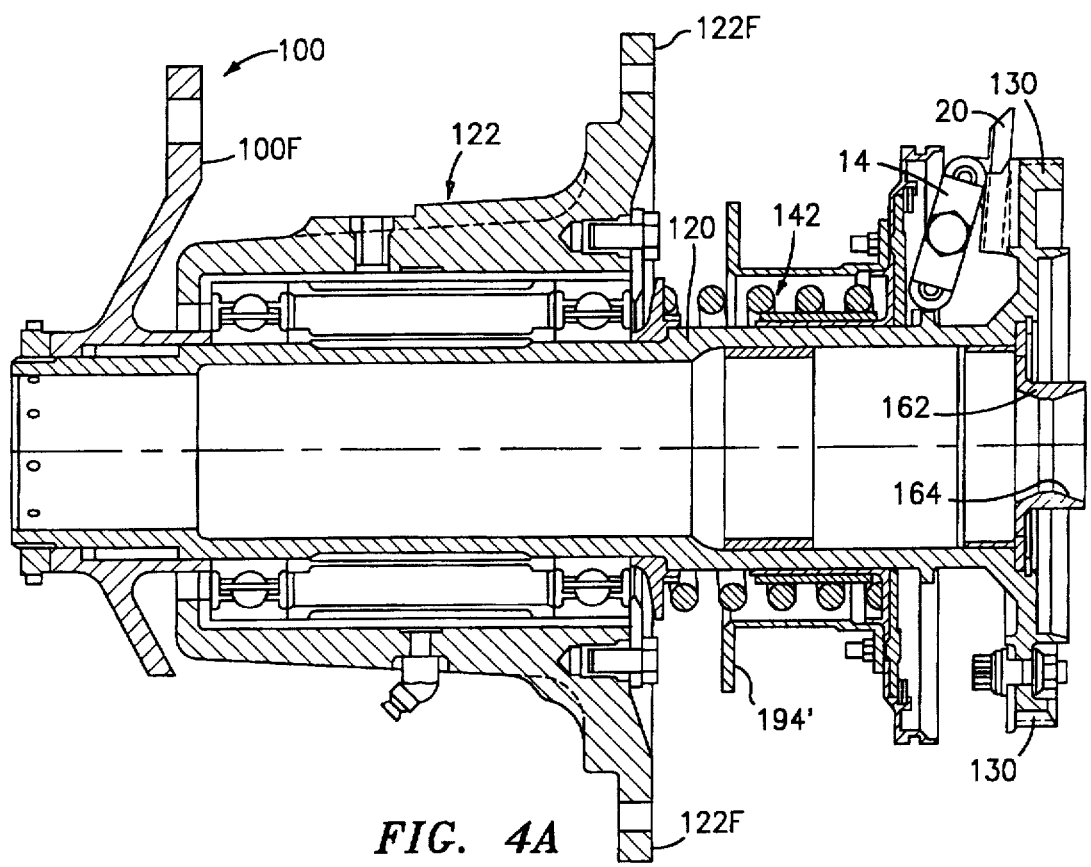
FIG. 4A is a cross-sectional view of the input segmented driveshaft portion of a disconnect coupling device.
Figure 4B:
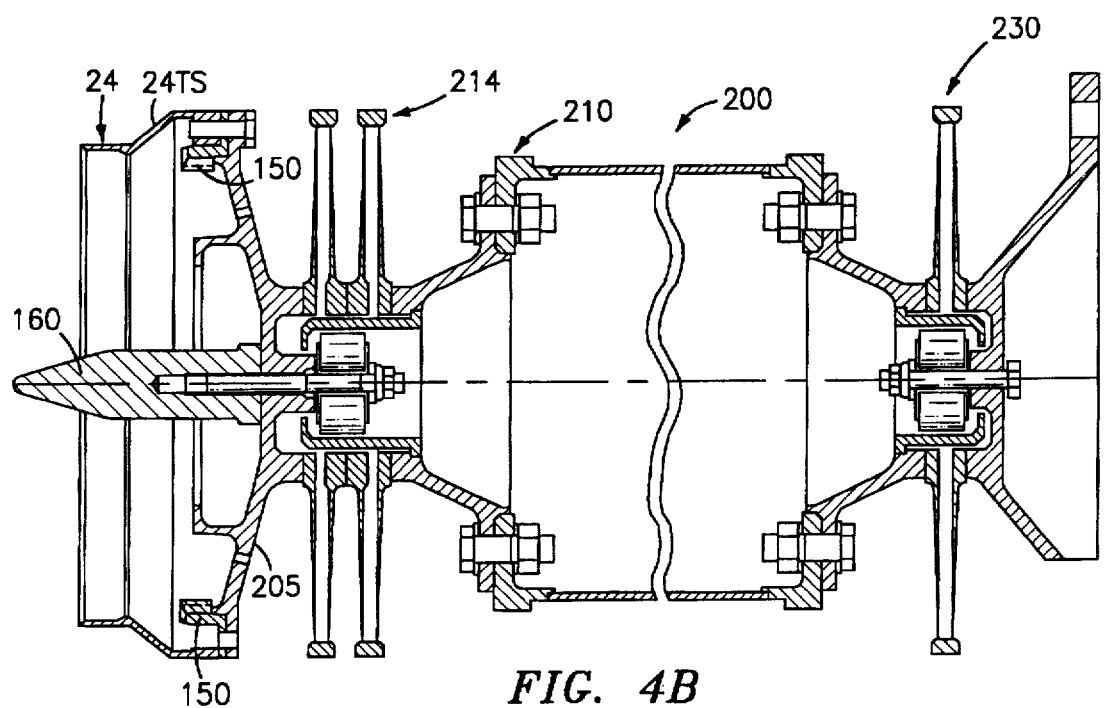
FIG. 4B is a cross-sectional view of the output segmented driveshaft portion of a disconnect coupling device.
Figure 4C:
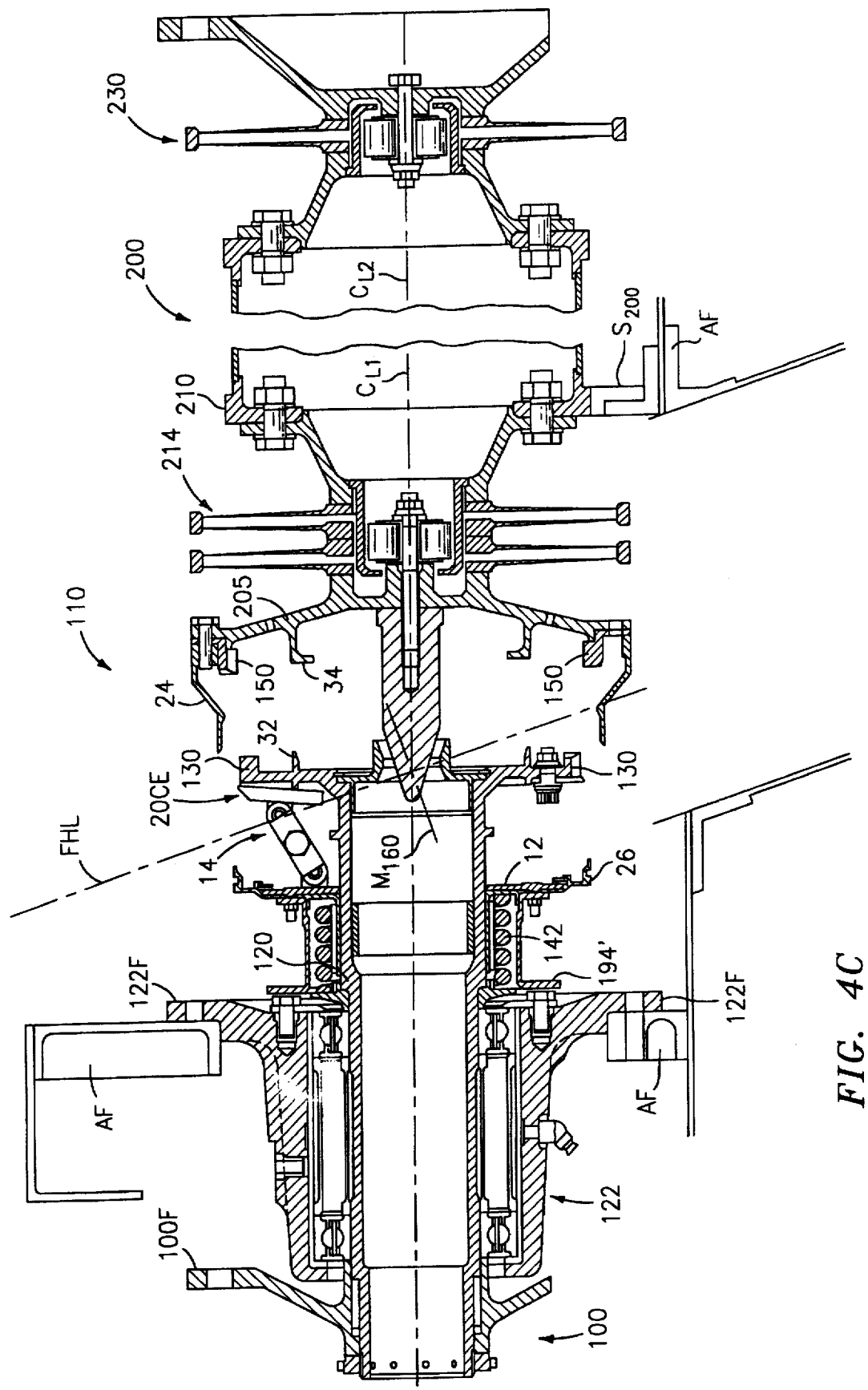
FIG. 4C is a cross-section view of the disconnect coupling device of FIGS. 4A, 4B in the decoupled configuration.

Referring now to FIGS. 4A–4C and 5 wherein like reference numerals identify corresponding or similar elements throughout the several views, FIGS. 4A–4C illustrate a disconnect coupling device 110 for a segmented driveshaft (as used herein, the terminology segmented driveshaft includes one or more driveshafts between the powerplant and the disconnect coupling device 110 and typically one driveshaft aft of the disconnect coupling device 110). The disconnect coupling device 110 is similar in configuration to the disconnect coupling device described hereinabove and in U.S. Pat. No. 5,360,376. The last two digits of the one hundred-series reference numerals identifying elements in FIGS. 4A–4C correspond generally to components identified by two-digit reference numerals in the '376 patent and the two-hundred series reference numerals identifying elements in FIGS. 4A–4C correspond to components identified by corresponding two-hundred series reference numerals in the '376 patent.

The disconnect coupling device 110 includes an input disconnect member 120 that is mechanically integrated in combination the input segmented driveshaft 100 (with reference to FIG. 4A, the input segmented driveshaft 100 is mechanically secured in combination with the disconnect coupling device 110 by means of the flange 100F) and rotatably supported in combination therewith by a duplex bearing assembly 122. The duplex bearing assembly 122 is rigidly secured to an infrastructure, e.g., the helicopter airframe AF, by means of the bearing flange 122F (see FIG. 4C). A splined input coupler 130 is integrated in combination with the input disconnect member 120 (for the embodiment illustrated in FIGS. 4A, 4C, and 5–6, the splined input coupler 130 is fabricated as an integral feature of the input disconnect member 120). A coil spring 142 is concentrically disposed about the input disconnect member 120. An actuator collar 194' is mounted in combination with the coil spring 142 and operative to bias the coil spring 142 between an engaged state wherein the coil spring 142 exerts a biasing force $F_S$ (see FIG. 6—for the described embodiment $F_S \approx 400$ lbs) and a disengaged state wherein the coil spring 142 is compressed, i.e., no biasing force is exerted. A guide sleeve 162 defining a channel 164 is mounted in combination with the input disconnect member 120.

The disconnect coupling device 110 further includes an output disconnect member 205 that is mechanically integrated in combination with a flange member 210 fixedly secured to the output segmented driveshaft 200 by means of a forward flexible coupling 214. An aft flexible coupling 230 is part of the output segmented driveshaft 200 aftwardly of the forward flexible coupling 214 and is operative to accommodate parallel offset between the disconnect coupling device 110 and the intermediate gearbox IGB (see FIG. 4C wherein reference characters "$C_{L1}$" identify the centerline of the driveshaft in the folded configuration and reference characters "$C_{L2}$" identify the centerline of the driveshaft in the flight configuration—the centerlines $C_{L1}$ and $C_{L2}$ converge at the aft flexible coupling 230). The flexible couplings 214, 230 permit axial and angular motion of the output disconnect member 205 with respect to the fixed flange member 210, thereby accommodating misalignments between the input and output segmented driveshafts 100, 200. The flexible couplings 214, 230 also accommodate movement of the forward portion of the output driveshaft segment 200 to rest upon a driveshaft support (reference characters "$S_{200}$" identify the driveshaft support in FIG. 4C—for the described embodiment the driveshaft support $S_{200}$ is secured in combination with the airframe AF (e.g., bulkhead)) when the disconnect coupling device 110 is decoupled. A splined output coupler 150 is mechanically integrated in combination with the output disconnect member 205 (for the described embodiment, by means of bolted connections). A guide pin 160 is also mechanically integrated in combination with the output disconnect member 205.

The guide pin 160 is operative in conjunction with the guide sleeve 162 to ensure proper alignment and engagement between the input and output splined couplers 130, 150 during coupling of the disconnect coupling device 110 to effectuate torque transfer between the input and output segmented driveshafts 100, 200. (Note that the locations of the guide pin 160 and the guide sleeve 162 are reversed from the embodiment of the disconnect coupling device illustrated in the '376 patent). Reference character "$M_{160}$" in FIG. 4C defines the motion of the tip of the guide pin 160 during folding of the tail rotor pylon.

A zero clearance locking mechanism 10 according to the present invention is integrated in combination with the disconnect coupling device 110 described in the preceding paragraphs and, in the locked position, functions as a rigid support for the output driveshaft segment 200. The locking mechanism 10 is operative to generate a locking force $F_D$ that positively locks the input and output splined couplers 130, 150 in intermeshing combination, thereby precluding inadvertent axial separation therebetween. The locking force $F_D$ exerted by the locking mechanism 10 ensures concentricity and proper meshing contact between the input and output splined couplers 130, 150 during rotation of the disconnect coupling device 110. The structural configuration of the locking mechanism 10 causes the locking force $F_D$ to be augmented with increasing rotational speed of the disconnect coupling device 110 due to the channeling of centrifugal forces through the locking mechanism 10. The stability, i.e., rigidity, of the locking mechanism 10 allows flexible couplings, e.g., the flexible couplings 214, 230 described hereinabove, to be incorporated in combination with the disconnect coupling device 110 to accommodate misalignments and deflections in the drivetrain, thereby preventing undue loading and/or wear in the disconnect coupling device 110.

Figure 5:
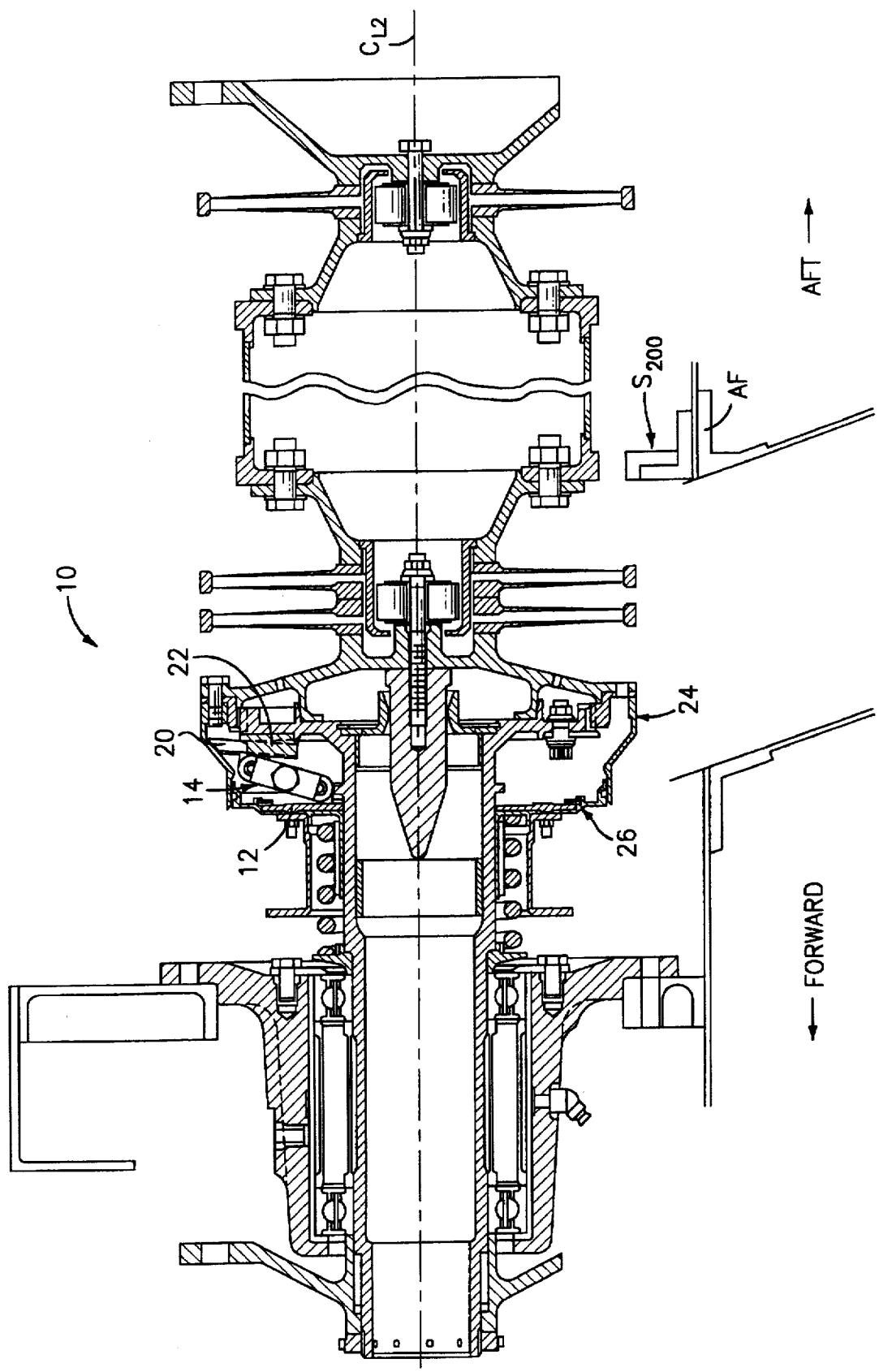
FIG. 5 is a cross-sectional view of the disconnect coupling device of FIGS. 4A, 4B in the coupled configuration with a zero clearance locking mechanism according to the present invention mechanically integrated in combination therewith.
Figure 6:
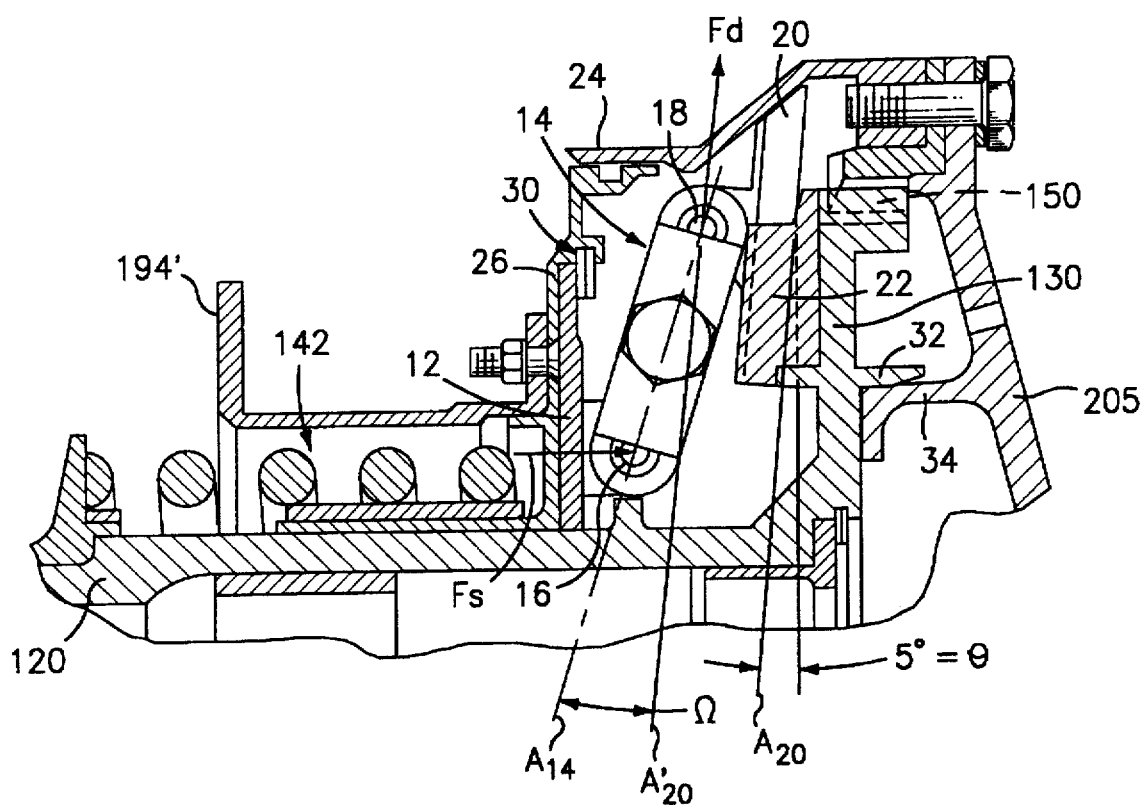
FIG. 6 is an enlarged, partial cross-sectional view based upon FIG. 5 illustrating in further detail a link, locking dog combination of the zero clearance locking mechanism according to the present invention.

With reference to FIGS. 5 and 6, the locking mechanism 10 comprises an annular equalizer plate 12, a plurality of links 14, a plurality of locking dogs 20, a plurality of dog guides 22, a concentric lock housing 24, and an annular sleeve 26. For the described embodiment of the locking mechanism 10, all of the components comprising the locking mechanism 10 are fabricated from stainless steel.

The annular sleeve 26 is rigidly secured in combination with the actuator collar 194' by any conventional technique, e.g., bolted connection, so that the coil spring 142 abuttingly engages the annular sleeve 26 (see in particular FIG. 6), i.e., the biasing force $F_S$ provided by the coil spring 142 is exerted against the annular sleeve 26. The annular sleeve 26 is displaceable aftwardly and forwardly in response to biasing of the coil spring 142 between the engaged state and the disengaged state, respectively.

The annular equalizer plate 12 is mounted in combination with the input disconnect member 120 in abutting engagement with the annular sleeve 26, and is displaced aftwardly and forwardly in synchronicity with the aftward and forward displacement of the annular sleeve 26. The annular equalizer plate 12 is free-floating with respect to the centerline $C_{L2}$ of the disconnect coupling device 110 (see in particular FIG. 6) to compensate for any tolerance deviations in the components comprising the locking mechanism 10 and/or the disconnect coupling device 110, thereby ensuring that all of the locking dogs 20 mechanically engage the concentric lock housing 24 (as described in further detail hereinbelow) when the lock mechanism 10 is in the locked state. A spiral lock retaining or snap ring 30 may be installed in combination with the annular sleeve 26 (see FIG. 6) to abuttingly engage the annular equalizer plate 12 to ensure retention of the equalizer plate 12 in abutting engagement with the annular sleeve 26.

Figure 7:
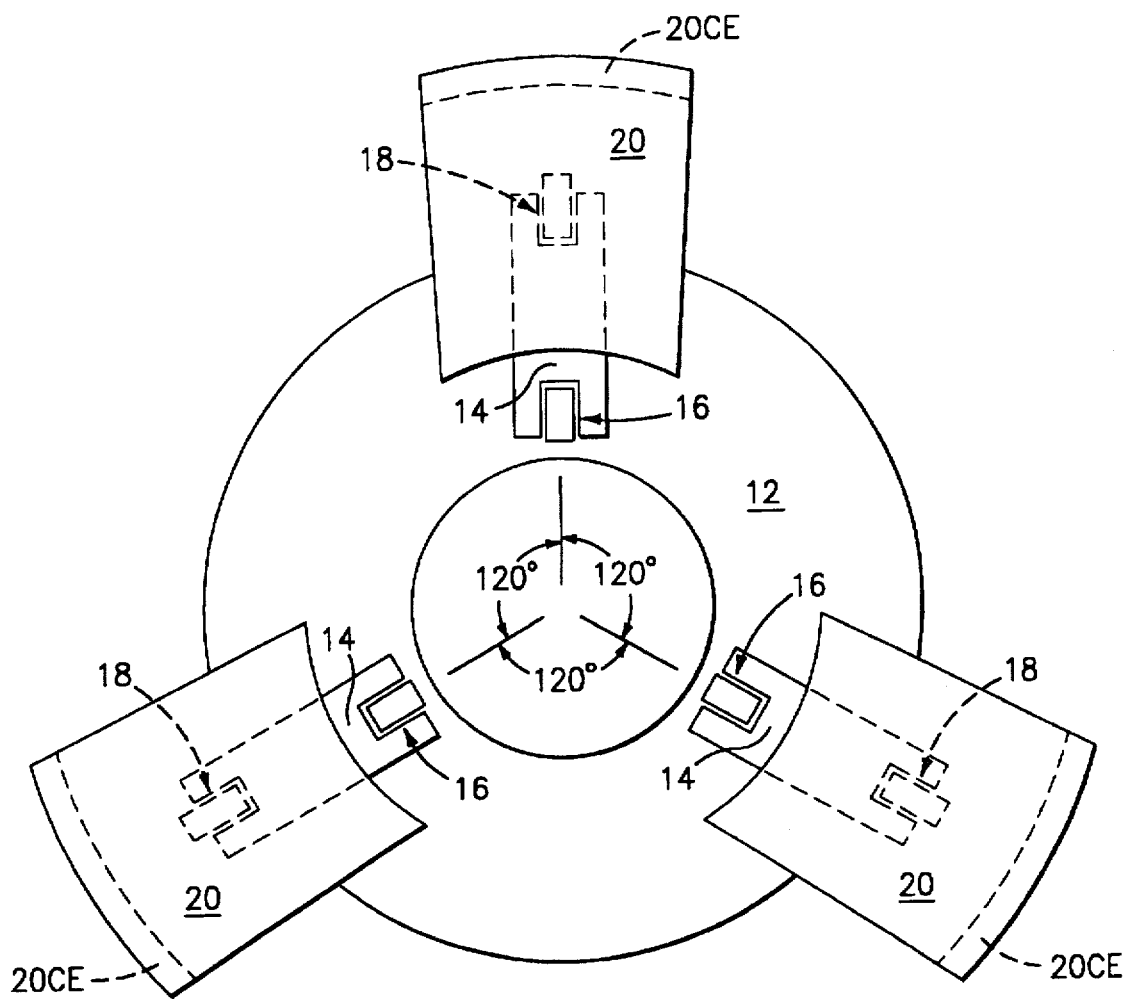
FIG. 7 is a schematic end plan view based upon FIG. 4A (aft end looking forward) illustrating the symmetrical distribution of three links, locking dogs in combination with the annular equalizer plate.

The plurality of links 14 (see also FIGS. 4A, 4C) are mechanically connected in rotatable combination at one end thereof with the annular equalizer plate 12 by any conventional means 16, e.g., pinned connection, bearing assembly (see in particular FIG. 6). The rotatable connection means 16 allows the links 14 to rotate about the axis defined by the rotatable connection means 16 as the coil spring 142 is cycled between the engaged and disengaged states (see FIGS. 4A and 4C, respectively). The plurality of links 14 are equidistantly spaced about the circumference of the annular equalizer plate 12. The preferred embodiment of the locking mechanism 10 has three links 14 spaced apart by 120° about the circumference of the annular equalizer plate 12 as schematically illustrated in FIG. 7.

A locking dog 20 is mechanically connected in rotatable combination at the other end of each link 14 by any conventional means 18, e.g., pinned connection, bearing assembly (see in particular FIG. 6). The rotatable connection means 18 allows the links 14 to rotate about the axis defined by the rotatable connection means 18 as the coil spring 142 is cycled between the engaged and disengaged states (see FIGS. 4A and 4C, respectively). Each locking dog 20 has a generally dovetailed or trapezoidal configuration to facilitate seating of the locking dog 20 in combination with the corresponding dog guide 22. The end of the locking dog 20 that mechanically engages the concentric lock housing 24 preferably has a conical configuration (as identified by reference characters 20CE in FIG. 4C).

A dog guide 22 is secured in combination with the input disconnect member 120 in alignment with each locking dog 20. Preferably, the dog guide 22 is fabricated as a single piece having a guide surface for seating the locking dog 20 and opposed sidewalls extending from the guide surface. The guide surface and the surfaces of the opposed sidewalls in combination are complementary to the dovetailed or trapezoidal configuration of the locking dog 20. The surfaces of the opposed sidewalls of the dog guide 22 mechanically interact with the opposed edges of the corresponding locking dog 20 and are operative to constrain the translational motion of the locking dog 20 along an axis $A_{20}$ defined by the guide surface. The translational axis $A_{20}$ defined by the guide surface of the dog guide 22 is slightly skewed with respect to a line orthogonal to the centerline $C_{L2}$ of the disconnect coupling device 110 (see reference character θ in FIG. 6). The skewed translational axis $A_{20}$ precludes the links 14 from locking when the locking mechanism 10 is in the unlocked position, i.e., with the locking dogs 20 in the retracted position.

The concentric lock housing 24 is secured in combination with the output disconnect member 205 (see also FIGS. 4B, 4C) by any conventional technique, e.g., bolted connection. The configuration of the concentric lock housing 24 includes an annular tapered segment 24TS that is structurally aligned with the conical ends 20CE of the locking dogs 20 with the locking mechanism 10 in the locked position. The concentric lock housing 24 is dimensioned so that free end thereof sealingly engages the flanged end of the annular sleeve 26 and the conical ends 20CE of the locking dogs 20 engage the annular tapered segment 24TS of the concentric lock housing 24 with the locking mechanism 10 in the locked position (see FIG. 5).

The unlocked position of the locking mechanism 10 is illustrated in FIG. 4C. The unlocked position is achieved by operating the actuator collar 194' to compress the coil spring 142 into the disengaged state. In the unlocked position, the locking dogs 20 are in a retracted position wherein the conical ends 20CE are out of the line-of-action of the free end of the concentric lock housing 24 such that the input and output disconnect members 120, 205 may be readily coupled in combination (or decoupled as a prestep to folding the tail rotor pylon).

The locked position of the locking mechanism 10 is illustrated in FIGS. 5 and 6. With the input and output disconnect members 120, 205 coupled in combination (the input and output splined couplers 130, 150 are mechanically engaged in meshing combination), the locked position is achieved by operating the actuator collar 194' to extend the coil spring 142 wherein the biasing force $F_S$ of the coil spring 142 is exerted against the annular equalizer plate 12, causing the annular equalizer plate 12 to be displaced aftwardly (to the right in FIG. 4C). Displacement of the annular equalizer plate 12 causes the plurality of links 14 to rotate synchronously with respect to the annular equalizer plate 12 about the axes defined by the rotatable connection means 16. The rotation of the links 14 causes a translational displacement of the locking dogs 20 along the translational axis $A_{20}$ (accompanied by a synchronous rotation of the links 14 about the axes defined by the rotatable connection means 18) to an extended position. In the extended position, the conical ends 20CE of the locking dogs 20 mechanically engage the tapered segment 24TS of the concentric lock housing 24. The mechanical engagement of the concentric ends 20CE of the locking dogs 20 against the tapered segment 24TS of the concentric lock housing 24 precludes any aftward displacement of the conical lock housing 24, thereby positively locking the input and output splined couplers 130, 150 in mechanical engagement for optimal torque transmission during rotation of the disconnect coupling device 110, i.e., the lock mechanism 10 precludes any axial separation between the input splined coupler 130 and the output splined coupler 150.

With the locking mechanism 10 in the locked position, the coil spring 142 exerts the biasing force $F_S$ against the annular equalizer plate 12. The locking force $F_D$ exerted by the locking dogs 20 against the concentric lock housing 24, due to the geometry of the lock mechanism 10, is defined generally (ignoring the effects of friction) by the equation:

$$F_D = \frac{F_S \cos\Omega}{\cos((90° - \theta) - \Omega)}$$

where $\Omega$ defines the angle (with respect to the axis defined by the rotatable connections means 18) between the axis $A_{14}$ of the link 14 and a line $A'_{20}$ parallel to the translational axis $A_{20}$ of the locking dog 20. For the embodiment of the locking mechanism 10 described herein wherein θ=5°:

$$F_D = \frac{F_S \cos\Omega}{\cos(85° - \Omega)}$$

However, due to the structural configuration of links 14 and the locking dogs 20 of the lock mechanism 10 according to the present invention, the locking force $F_D$ is augmented during drivetrain operation, i.e., during rotation of the disconnect coupling device 110. Rotation of the disconnect coupling device 110 causes a centrifugal force effect to be exerted through the plurality of links 14 and the plurality of locking dogs 20 against the annular tapered segment 24TS of the concentric lock housing 24. As the rotational speed of the disconnect coupling device 110 is increased, the centrifugal force effect component of the locking force $F_D$ is concomitantly increased. Thus, the structural configuration of the lock mechanism 10 effectively augments the locking force $F_D$ exerted against the concentric lock housing 24 by the effects of centrifugal force acting through the links 14 and locking dogs 20.

The lock mechanism 10 according to the present invention has a zero clearance configuration, as evidenced by the rigidity of the lock mechanism 10 in the locked position, as a result of the structural and functional interrelationships between the locking dogs 20 and the concentric lock housing 24. As noted above, the locking dogs 20 in the retracted position do not mechanically interact with the concentric lock housing 24 during coupling (or decoupling) of the input and output disconnect members 120, 205 such that the free end of the concentric lock housing 24 may be readily assembled in combination with (or disassembled from) the annular sleeve 26. When the coil spring 142 is engaged, the biasing force $F_S$ exerted by the coil spring 142 causes displacement of the annular equalizer plate 12, and concomitantly, the translational displacement of the locking dogs 20 along the translation axes $A_{20}$, until the conical ends 20CE mechanically engage the tapered segment 24TS of the concentric lock housing 24. The uninterrupted engagement force exerted by the locking dogs 20 continually biases the concentric lock housing 24 in the forward direction (but forward movement of the concentric lock housing 24 is precluded as discussed in following paragraph) to achieve rigidity of the locking mechanism 10 in the locked position.

For the described embodiment, the input disconnect member 130 includes an annular flange 32 and the output disconnect member 205 includes an annular stop flange 34 (see FIGS. 5, 6). The interactive combination of the annular flange 32 and the annular stop flange 34 precludes forward or outward displacement of the concentric lock housing 24 during rotation of the disconnect coupling device 10.

A variety of modifications and variations of the present invention are possible in light of the above teachings. It is therefore to be understood that, within the scope of the appended claims, the present invention may be practice otherwise than as specifically described hereinabove.

What is claimed is:

1. A locking mechanism for a disconnect coupling device for a segmented driveshaft, the disconnect coupling device including an input disconnect member having an input splined coupler integrated in combination therewith, an output disconnect member having an output splined coupler integrated in combination therewith, and means for generating a biasing force, comprising:

a concentric lock housing secured in combination with the output disconnect member;

an annular equalizer plate disposed in free-floating combination with the input disconnect member and operatively interconnected to the biasing force generating means;

a plurality of links mechanically connected in rotatable combination with said annular equalizer plate, said plurality of links being equidistantly spaced about the circumference of said annular equalizer plate;

a locking dog mechanically connected in rotatable combination with each of said plurality of links; and a dog guide secured in combination with the input disconnect member in alignment with each said locking dog, said dog guide defining a translation axis for said corresponding locking dog for displacement of said locking dog between a retracted position and an extended position;

wherein in a locked position of said locking mechanism said biasing force generating means causes displacement of said locking dogs to said extended position wherein said locking dogs mechanically engage said concentric lock housing with a locking force to positively lock the input and output splined couplers in mechanical engagement in meshing combination; and wherein said structural configuration of said links and said locking dogs in combination causes said locking force to be augmented by centrifugal force effects acting through said links and locking dogs.

2. The locking mechanism of claim 1 further comprising:

an annular sleeve rigidly secured in combination with the biasing force generating means such that the biasing force is exerted against said annular sleeve, and wherein said annular equalizer plate abuttingly engages said annular sleeve.

3. The locking mechanism of claim 2 further comprising snap ring means installed in combination with said annular sleeve in abutting engagement with said annular equalizer plate for retaining said annular equalizer plate in abutting engagement with said annular sleeve.

4. The locking mechanism of claim 1 wherein said plurality of links comprises three links, and wherein said links are equidistantly spaced apart by 120° about the circumference of said annular equalizer plate.

5. The locking mechanism of claim 1 wherein each of said locking dogs has a conical end and wherein said concentric lock housing has an annular tapered segment such that said conical ends of said locking dogs engage said annular tapered segment with said locking dogs in said extended position.

6. The locking mechanism of claim 1 wherein each said translational axis defined by said dog guide is offset from a line orthogonal to the centerline of the disconnect coupling device by an angle θ to prevent said links from locking with said locking dogs in said retracted position.

7. The locking mechanism of claim 1 wherein said locking force exerted by said locking dogs is defined by $$F_D = \frac{F_S \cos\Omega}{\cos((90° - \theta) - \Omega)}$$

where Ω defines the angle between the axis of said link and a line parallel to said translational axis of said locking dog.

8. The locking mechanism of claim 1 further comprising:

an annular flange integrated in combination with the input disconnect member; and an annular stop flange integrated in combination with the output disconnect member;

wherein said annular flange and said annular stop flange in interactive combination preclude forward and outward displacement of said concentric lock housing during rotation of the disconnect coupling device.

* * * * *